United States Patent [19]
Lehtonen et al.

[11] Patent Number: 6,014,573
[45] Date of Patent: Jan. 11, 2000

[54] FUNCTION FOR FACILITATING USE OF A DOUBLE-ACTING COMMUNICATION DEVICE AND A DOUBLE-ACTING COMMUNICATION DEVICE

[75] Inventors: Arto Lehtonen; Jarmo Mäkelä, both of Tampere, Finland

[73] Assignee: Nokia Mobile Phones, Ltd., Salo, Finland

[21] Appl. No.: 08/654,874

[22] Filed: May 29, 1996

[30] Foreign Application Priority Data

Nov. 24, 1995 [FI] Finland .................................. 955683

[51] Int. Cl.⁷ .................................................. H04M 11/00
[52] U.S. Cl. .......................... 455/569; 455/556; 455/414; 379/58
[58] Field of Search ..................... 370/493, 494, 370/495, 496; 455/90, 100, 414, 566, 567, 568, 569, 550, 556, 571, 575

[56] References Cited

U.S. PATENT DOCUMENTS

| | | | |
|---|---|---|---|
| 5,175,759 | 12/1992 | Metroka et al. ......................... | 455/575 |
| 5,224,151 | 6/1993 | Bowen et al. ........................... | 455/569 |
| 5,333,176 | 7/1994 | Burke et al. ............................ | 455/569 |
| 5,337,346 | 8/1994 | Uchikura ................................. | 379/58 |
| 5,584,054 | 12/1996 | Tyneski et al. .......................... | 455/566 |
| 5,588,041 | 12/1996 | Meyer, Jr. et al. ...................... | 379/59 |
| 5,742,912 | 4/1998 | Nishiyama et al. ..................... | 455/566 |
| 5,749,056 | 5/1998 | Patterson et al. ....................... | 455/569 |

FOREIGN PATENT DOCUMENTS 41 08 169 A1  9/1991  Germany .

*Primary Examiner*—Edward F. Urban
*Assistant Examiner*—Thuan T. Nguyen
*Attorney, Agent, or Firm*—Perman & Green, LLP

[57] ABSTRACT

The invention relates to use of a double-acting communication device comprising a separate first user interface (1) which is substantially a telephone user interface including sound reproducing means, and a separate second user interface (2) which is substantially a keypad and display user interface. The first and the second user interface can be used at different times and simultaneously, whereby in the simultaneous use the communication device is substantially located on a table or in the lap and not at the ear like when using the telephone user interface only. Thus, when a simultaneous use is started, the sound reproducing volume is increased so that the user can hear the voice from the speaker (3, 5) even though the device is far from the user's ear. The second user interface (2) is located inside the device, so that it is preferable to locate the switch (15) affecting the sound reproduction volume so that it is attached to the opening mechanism of the device.

12 Claims, 3 Drawing Sheets

FUNCTION FOR FACILITATING USE OF A DOUBLE-ACTING COMMUNICATION DEVICE AND A DOUBLE-ACTING COMMUNICATION DEVICE

BACKGROUND OF THE INVENTION

The present invention relates generally to a function of a mobile communication device for facilitating the use of the mobile communication device, and it relates particularly to using a hands free function in a mobile communication device comprising two separate user interfaces. The invention is also related to a double-acting mobile communication device, two separate user interfaces of which can be simultaneously utilized.

Mobile telephones operating in a cellular radio network have become common and widely used personal communication devices. In addition to the conventional telephone operation, mobile phones of prior art can be equipped with numerous accessories that diversify their use. One known accessory arrangement is the hands free equipment that is meant for facilitating the use of a mobile phone in a situation, where the user can't hold the telephone in his/her hand continuously, e.g. because of driving a car. This kind of an arrangement can include e.g. an additional speaker, through which the voice from the telephone can be reproduced with increased volume, a car microphone to be disposed near the user who is in a normal driving position, power supply means for supplying electric power from the electric system of the car to the mobile phone and switch means for switching on the hands free equipment when the telephone is put to its rack in the car.

From the patent publication U.S. Pat. No. 5,175,759 it is known a solution, wherein a flip acting as an operating switch and covering its keypad also activates the hands free function when needed. The solution in question provides a hands free equipment like the one described above and delivered as accessory, and when a movable flip element covering the keypad is opened, a control unit of the telephone checks, if the telephone is connected to the hands free equipment. If the result of checking is yes, the control unit goes to a standby state for receiving operation commands through spoken voice or by other means.

In the future, mobile phones will be equipped with a greater variety of functions than today, which will diversify both the telecommunication in itself and the use of mobile phones in connection with the telecommunication or as addition for required peripheral functions. From the patent publication U.S. Pat. No. 5,337,346 it is known a mobile phone, the numerical keypad of which can be turned to one side, revealing a larger alphanumeric keyboard below it. In the mentioned publication an object of the invention is said to be a mobile phone, which can include an electronic notebook function, and it is proposed that the power supply to the radio sections of the device is switched off when the notebook function is used. Additionally, from the publication "Portable Communication" by Peter E. Jackson and David A. Deans, Proceedings of the National Communications Forum, 42 (1988). September 30, No. 2, Chicago, IL, USA, it is known a personal communication device including both a numerical keypad and a character keypad in a device resembling modern mobile phones. It appears from the text of the publication that it expressly refers to a mobile terminal of a wide-area communication system, where the terminal can freely move within the coverage area of the system and where the system monitors the location of the terminal so that it can correctly route calls to a certain terminal device. In said reference publication the device is presented at an outline level, and there is no detailed description of its structure or functioning.

From the Finnish patent application "Double-acting communication device" filed at the same time with the present patent application, it is known a quite new kind of a personal communication device, comprising, like shown in FIG. 1, two separate user interfaces. The first user interface 1 is substantially equal to the user interface of mobile phones of prior art. It is located on an outer surface of the device and includes in its preferred embodiment a speaker 3, a microphone 4, a numerical keypad 1a and a small-sized display 1b. In order to use the second user interface 2, this so called double-acting communication device will be opened, so that a large display 2a and a complete alphanumeric keypad 2b, a so called QWERTY keyboard become accessible. By means of the first user interface, the device is intended to be used like a conventional mobile phone of a cellular network, whereat the device can be kept closed and is, because of its compact shape and small size, easy to handle. Through the second user interface, text and graphical messages as well as data and telefax messages between computers can be transmitted and received and an electronic notebook or a calendar and eventual additional functions like a calculator program, an electronic dictionary, etc. can be used. The two user interfaces of the device can be used independently of each other, but also simultaneously so that the user, e.g. in the middle of a telephone conversation, can open the device and check from the electronic calendar an appointed date or write down an important note in the electronic notebook.

SUMMARY OF THE INVENTION

It is one object of the present invention to provide a method for facilitating the use of a double-acting communication device especially in connection with a simultaneous use of the user interfaces. It is another object of the present invention also to provide a double-acting communication device, in which this kind of a facilitating method is applicable.

The objects of the present invention are attained by an automatic switching function for switching on the hands free function when the device in the middle of a telephone conversation is removed from the telephone use position and for switching it off when the device in the middle of a telephone conversation is returned to the telephone use position.

The method in accordance with the present invention for using a double-acting communication device comprising a first and a second user interface is characterized in that when the user starts a simultaneous use of the first and second user interface, the volume of the voice reproduced by the communication device is significantly increased compared with the volume of the voice during a telephone connection through the first user interface only.

The present invention is also related to a double-acting communication device, in which the described method is applicable. The double-acting communication device in accordance with the present invention is characterized in that it includes a control block, first switch means connected thereto for producing information to said control block means about starting the use of the first user interface and second switch means for producing information to said control block means about starting the use of the second user interface and sound volume control means arranged so that in response to the information given by said first and second switch means about starting a simultaneous use of the first and second user interface, said control block adjusts the volume of the voice reproduced by said sound reproducing means significantly louder compared with the volume of the voice during the telephone communication through the first user interface only.

As described above, the mobile communication device disclosed by the Finnish patent application "Double-acting communication device", filed at the same time as the present application, comprises two separate user interfaces, of which the first one is a telephone user interface and the second one can be used e.g. as an electronic notebook or calendar. The two user interfaces can be used simultaneously for instance so that a user during a call agrees on a meeting and before fixing the time wants to check that there are no other appointments marked in his/her calendar at that time. The user then opens the mobile communication device, so that a large-sized display and an alphanumeric keypad come into his/her view. Through depressing a couple of keys, the user brings the right page of his/her calendar into the large-sized display and can check his/her previous appointments and mark the new one into the agreed date and time.

For being able to perform the above mentioned functions, the user must, however move the mobile station away from the normal telephone use position, where the speaker and the microphone of the first user interface are close to the user's ear and mouth. The calendar is preferably used in a position, in which the mobile station is on the desk in front of the user or in his/her hands or lap, whereby the distance from the speaker and microphone to the user's ear and mouth is much longer than in the telephone use position. In that case it is preferable that at least the reproduction volume is increased and eventually also the recording sensitivity, in other words the gain of the amplifier that belongs to the microphone circuit, is increased, which in a certain way corresponds to the hands free function of the above described mobile phones of prior art. Although the hands are necessary for using the calendar function in the preferred embodiment, the expression "hands free function" will be used in the following with reference to the functions according to the present invention related with keeping up a telephone connection when moving the device from the telephone use position (from the ear) to the second position of use.

According to the present invention, a double-acting communication device will be equipped with a switch for switching on the hands free functions when the device in the middle of a telephone conversation is removed from the telephone use position and for switching off the same functions when the device in the middle of a telephone conversation is returned to the telephone use position. "Telephone use position" refers here to the mutual position of the user and the device, in which the user keeps the device at the side of his/her head like a conventional mobile phone. A typical situation where the user moves the device away from the telephone use position in the middle of a call is described above. It is characteristic of the situation that the user takes the second user interface into use, which means that the user opens the device. In a preferred embodiment of the present invention, said switch acts in response to the moving of the parts of the device from closed position to open position. The closed position refers here to the mutual position of the parts of the device, where only the first user interface is usable, and the open position refers to the mutual position of the parts of the device where both the first and the second user interface are available.

BRIEF DESCRIPTION OF THE DRAWINGS

In the following, the present invention will be described in more detail, with reference to an exemplified preferred embodiment and accompanying drawings, where.

DETAILED DESCRIPTION OF THE INVENTION

Figure 1:
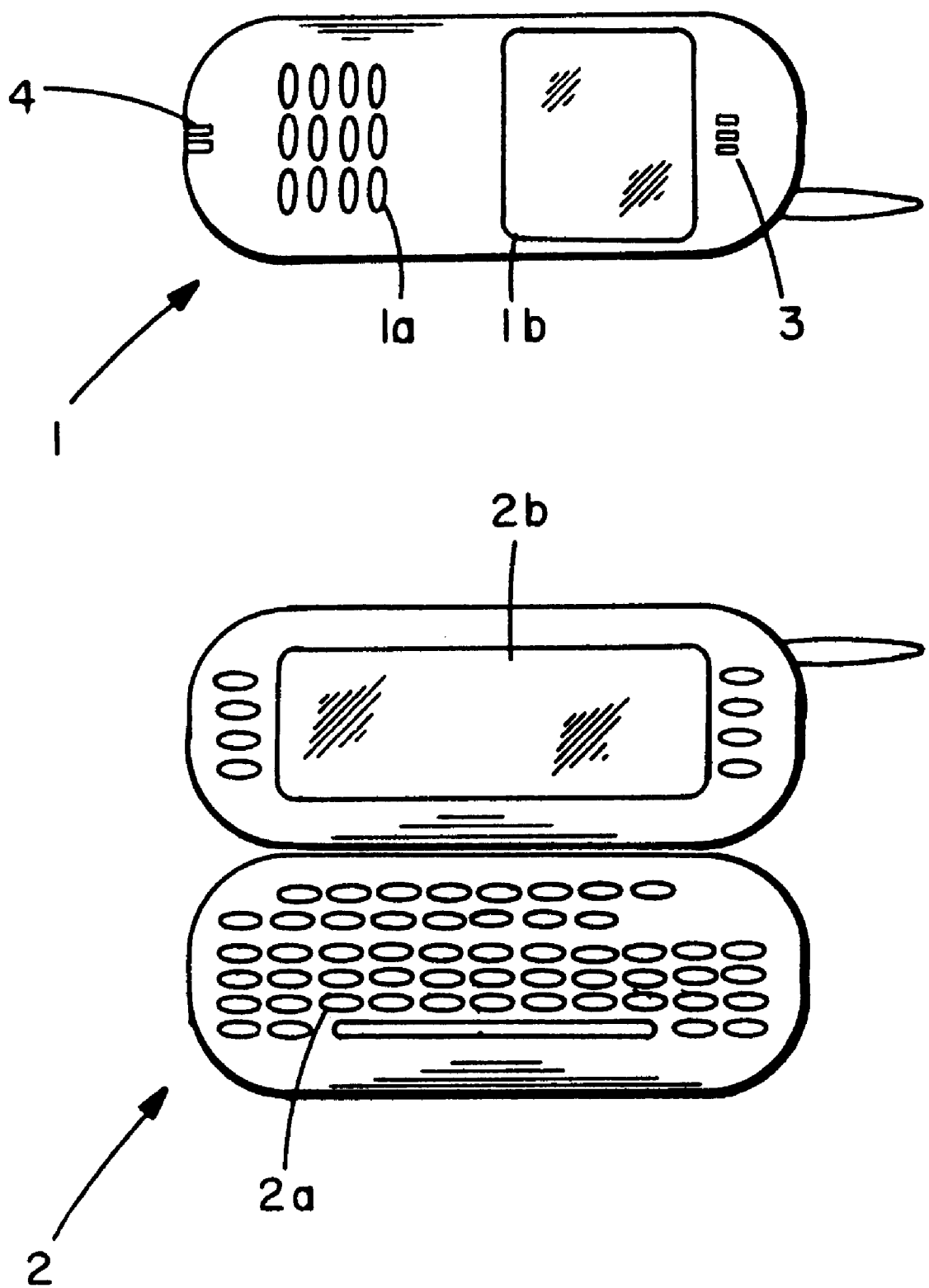
FIG. 1 illustrates a double-acting communication device in general

In the foregoing, reference was made to FIG. 1, so that in the following, the present invention and its preferred embodiments will be described primarily with reference to FIGS. 2 and 3. In the figures the corresponding elements are identified by the same reference numbers.

Figure 2A:
FIGS. 2a–2c illustrate schematically use of a device in accordance with the invention in two different positions.
Figure 2B:
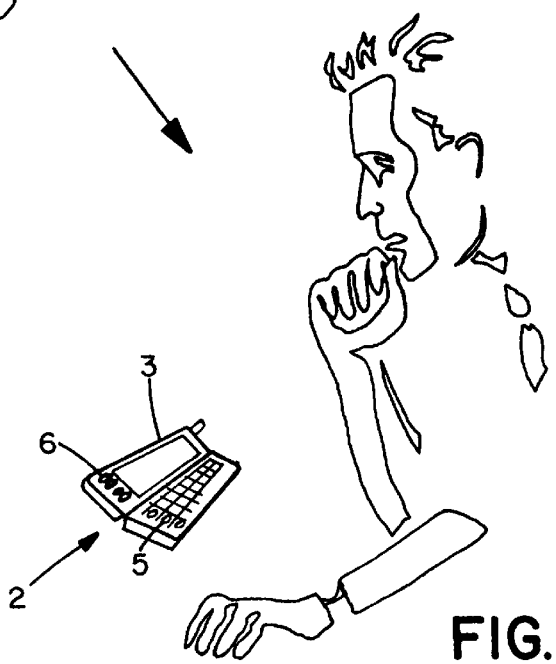
Figure 2C:

In FIG. 2a there is shown a situation, where a double-acting communication device is used in the telephone use position. There the user keeps the device at the side of his head like a conventional mobile phone. In FIG. 2b the user has moved the device in front of him and opened it (turned the parts of the device into the open position, in other words, turned the halves to an approx. angle of 135 degrees with respect to each other) in order to use the second user interface 2 of the device in the middle of a call. The figure illustrates how the recording and reproducing distances are changed. In order to keep up the call without difficulty also in a situation of FIG. 2b, the reproduction volume of the speaker 3 has to be increased. Alternatively, the device can be equipped with another speaker 5 that is switched on when the device is opened and that reproduces the voice louder than the telephone speaker 3. Also the recording level can be increased in a certain preferred embodiment by increasing the gain of the microphone amplifier coupled with the telephone microphone 4 or by switching on another microphone 6. In FIG. 2c, the user has stopped using the second user interface, closed the device (turned the parts of the device into a closed position) and lifted it back to the telephone use position.

Figure 3:
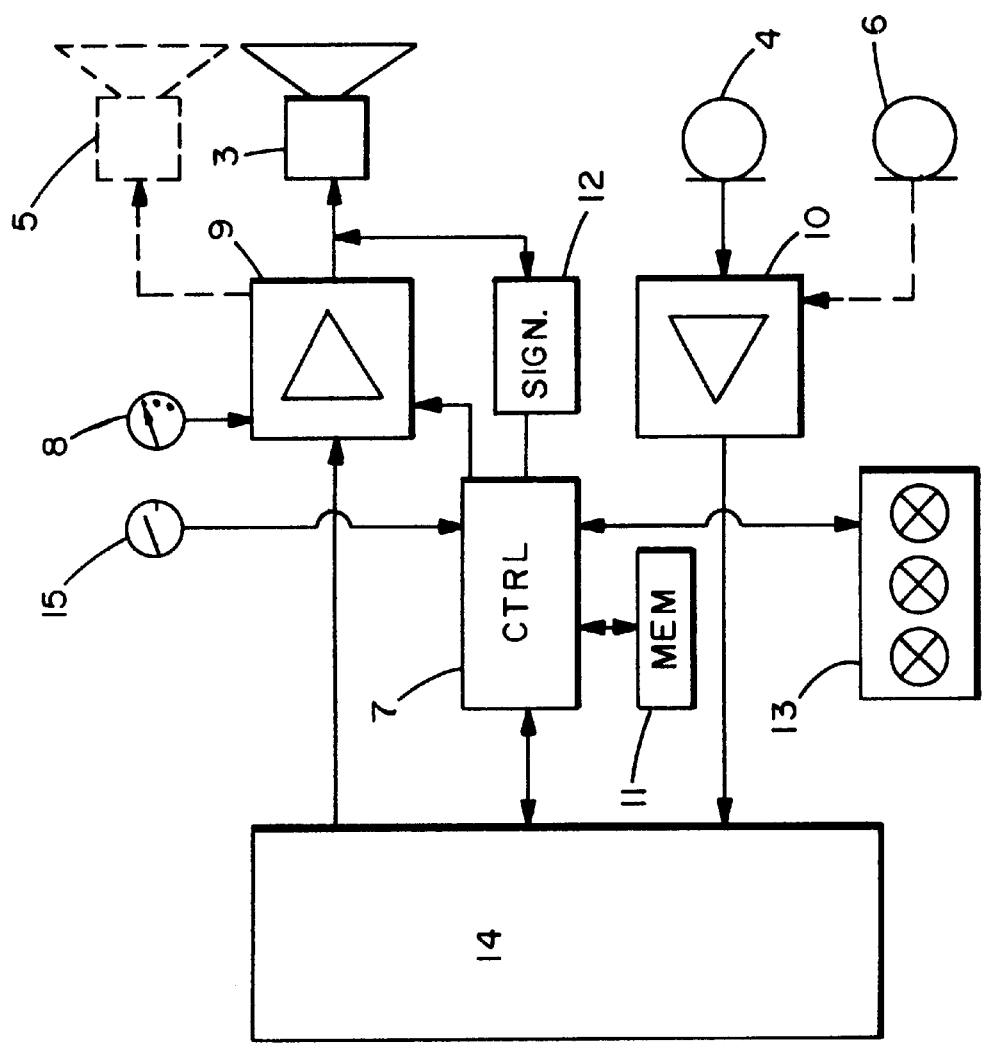
FIG. 3 illustrates schematically those parts of the double acting communication device that are necessary for the implementation according to the present invention.

FIG. 3 illustrates schematically those parts of the double-acting communication device that are necessary for an implementation according to the present invention. The operation of the device is controlled by a control unit 7 that is preferably a microprocessor. The device includes at least one speaker 3 and at least one microphone 4. In another certain embodiment the device can include a second speaker 5 and/or a second microphone 6. The device can also include fine tuning means for volume, that is, the so called volume switch 8, by means of which the user can adjust the volume of the reproduced voice. The volume of the speaker or speakers depends on the gain of the amplification block 9 of the reproduction circuit and the recording level of the microphone or microphones depends on the gain of the amplification block 10 of the recording circuit said gains being determined by the control unit 7 based on the input data received by it and the program stored into its memory means 11. The device can further include a sound signal section 12 the function of which is to reproduce a short sound signal through the speaker(s), when any of the keys is depressed by the user, and an illumination section 13 for controlling the illumination of the keypads and the displays. For simplicity, all those parts that are used for the actual data communication functions are shown only as a block symbol 14 in FIG. 3.

The device includes as a substantial part a switch 15, the function of which is to give information to the control unit 7 that the hands free function is needed, and which in the preferred embodiment acts in response to opening the device. This kind of a switch is in itself known in the art, since one is included in the device according to the U.S. Pat. No. 5,175,759, described above in connection with the prior art. It is clear for a man skilled in the art that also other kinds of switches acting in response to taking the second user interface into use are applicable. Examples are e.g. a photocell inside the device in connection with the second user interface, a separate switch reachable and usable to the user or a heat sensor detecting whether the device is close to a heat source like the user's head. The invention can also be applied so that through pushing any of the switches or keys of the second user interface, the control unit is informed that the second user interface has been taken into use.

When the control unit 7 gets the information that the second user interface has been taken into use, it switches on all those so called hands free functions that help to keep up a call during the use of the second user interface. It has been presented above that these functions include at least increasing the reproduction volume and possibly increasing the recording sensitivity. In one preferred embodiment, further, the control unit switches off the sound signal 12 because the sound signals produced by depressing of the keys may disturb the telephone conversation. Further, the control unit can switch off the illumination 13 of the keypad and the display included in the first user interface in order to save electric power, because the first and the second user interface are not simultaneously visible to the user.

When the use of the second user interface is stopped the control unit 7 gets the respective information again through the switch 15. Then, the control unit 7 switches off the hands free function and the user can use the device like a traditional mobile phone. The switching off can be activated also by a different switch than the switching on. In one preferred embodiment the hands free functions are not automatically switched on when the device is opened, but only after the user has depressed a certain key of the second user interface. By using the same key the user can switch off the hands free functions also during the use of the second user interface or he/she can close the device, whereby a switch reacting to the mutual movement of the device parts described above automatically switches off the hands free functions. Based on what have been stated above, it is clear for a man skilled in the art that very many kinds of combinations of switch, push-button and time-delay functions can be used for switching on and off the hands free functions manually, automatically or semi-automatically without departing from the scope of the present invention. The volume controller 8 of the device acts normally both during use of the hands free functions and without them. A certain increase of the basic volume is a part of the hands free functions but after that the user can fine tune the volume to the required level by means of the volume controller 8.

The automatic activation of the hands free function has been described above in a situation that there is already a call going on when the user starts using the second user interface. The operation in accordance with the invention also concerns a situation that the second user interface is in use and the call will be started later. In that case the control unit 7 has been informed by the switch 15 that the second user interface has been taken into use when the device has been opened into the position shown in FIG. 2b. When the call is started after this, the control unit 7 gets information thereof in accordance with a normal mobile phone operation, whereby it switches on the hands free function in the same way as described above. A normal mobile phone operation means in the most telephones that the information about starting a call is received when the user has entered or otherwise selected the desired telephone number and pushes the so called Send key of the call. From the point of view of the invention, a simultaneous use of the telephone connection and the second user interface is substantial, and not so much the question which one was started first.

With the arrangement in accordance with the present invention, the use of a double-acting data communication device will be easy, since the user doesn't have to take separately care of increasing the volume in case he/she moves the device away from the ear during a call, in order to use the second user interface. In the preferred embodiment of the invention, only very few additional parts or changes are required compared with a device in which an arrangement according to the invention is not used, and accordingly, manufacturing costs are not unreasonably increased.

What is claimed is:

1. A method for maintaining a call in a double-acting communication device comprising a separate first user interface being substantially a telephone user interface, and a separate second user interface being substantially a keypad and display user interface, and the first and the second user interfaces can be used in different times and simultaneously and the communication device includes adjustable voice reproduction means, wherein said voice reproduction means includes a first speaker and a second speaker, the method comprising steps of:

providing a sensor of concurrent usage of the first and the second user interfaces;

sensing by the sensor a simultaneous use of the first and the second user interfaces;

in response to the sensing of the simultaneous use by the sensor, increasing, by means of a control unit of the communication device, the volume of the voice reproduced by the communication device significantly compared with the volume during a telephone connection through the first user interface only;

wherein said step of increasing the voice volume includes a switching from use of only said first speaker during use of only said first interface to a use of said second speaker during said concurrent usage of said first and said second user interfaces.

2. A method in accordance with claim 1, wherein said increasing of volume is realized by the sensor in response to moving the parts that belong to the communication device into a position in which the second user interface becomes available to the user.

3. A method in accordance with claim 1, wherein said increasing of volume is realized by the sensor in response to a command given by the user by depressing a key.

4. A method in accordance with claim 1, wherein in addition to increasing of the volume, also the recording level of the recording circuit included in the first telephone user interface is substantially simultaneously increased.

5. A method in accordance with claim 1, wherein, in addition to increasing the volume, also sound signals produced by the communication device in connection with depressing the keys is substantially simultaneously prevented.

6. A method in accordance with claim 1, wherein, in addition to increasing the volume, also illumination associated with the first user interface is substantially simultaneously switched off.

7. A double-acting communication device comprising:

a separate first user interface being substantially a telephone user interface for creating a telephone connection and for keeping up a telephone connection;

a separate second user interface being substantially a keypad and display user interface for transmitting information through the keypad from the user to the device and through the display from the device to the user; and means for sensing concurrent usage of the first and the second user interfaces, said sensing means comprising a first switch means and a second switch means;

whereby the first and the second user interfaces can be used at different times or simultaneously, and the communication device includes adjustable sound reproduction means including sound volume control means operative in response to the sensing means, said sound reproduction means further comprising a first speaker and a second speaker;

wherein the first switch means produces information about starting the use of the first user interface and the second switch means produces information about starting the use of the second user interface;

in response to the information given by said first and said second switch means about starting a simultaneous use of the first and the second user interfaces, said sound volume control is operative to adjust the sound volume of the sound reproducing means to a first level; and in response to the information given by said first and/or said second switch means about the use of the first user interface only, said sound volume control means is operative to adjust the sound volume of the sound reproducing means to a second level, said second level being lower than said first level, said sound volume control means being operative further to switch from a use of only said first speaker during use of only said first interface to a use of said second speaker during said concurrent usage of said first and said second user interfaces.

8. A communication device in accordance with claim 7, further comprising an openable outer covering, and wherein the second user interface includes parts located inside said openable outer covering, whereby said outer covering must be opened in order to use the second user interface, and said first switch means is operative to act in response to an opening of said outer covering.

9. A communication device in accordance with claim 7, wherein said second switch means includes a switch being at a user's disposal.

10. A communication device in accordance with claim 7 further comprising adjustable sound recording means, a control block and, attached to said control block, control means of the recording level operative so that in response to starting a simultaneous use of the first and the second user interfaces, said control block is operative to adjust the recording level of said sound recording means into a first level and in response to the use of the first user interface only, said control block is operative to adjust the recording level of said sound recording means into a second level, said second level corresponding to a lower recording level than said first level.

11. A communication device in accordance with claim 7 further comprising sound signal means for giving sound signals in response to a depressing of keys of the user interfaces; and in response to a starting of the simultaneous use of the first and the second user interfaces, said control block switches off said sound signal means.

12. A double-acting communication device comprising:

a separate first user interface being substantially a telephone user interface for creating a telephone connection and for keeping up a telephone connection;

a separate second user interface being substantially a keypad and display user interface for transmitting information through the keypad from the user to the device and through the display from the device to the user, wherein the first and the second user interfaces can be used at different times or simultaneously;

means for sensing concurrent usage of the first and the second user interfaces;

adjustable sound reproduction means including sound volume control means operative in response to said sensing means to produce a desired level of sound outputted by said sound reproduction means, said sound reproduction means further comprising a first speaker and a second speaker; and wherein, in response to a sensing by said sensing means of said concurrent usage of said first and said second user interfaces, said sound volume control means is operative to raise the sound level by switching from a use of only said first speaker during use of only said first interface to a use of said second speaker during said concurrent usage of said first and said second user interfaces.

* * * * *